United States Patent
Boss et al.

[11] Patent Number: 5,868,942
[45] Date of Patent: Feb. 9, 1999

[54] PROCESS FOR TREATING A WASTE SLUDGE OF BIOLOGICAL SOLIDS

[76] Inventors: Edward E. Boss, 13700 Veterans Memorial Dr., Suite 380, Houston, Tex. 77014-1017; Samuel L. Shepherd, 5211 Mulberry Grove, Kingwood, Tex. 77345

[21] Appl. No.: 910,849

[22] Filed: Aug. 13, 1997

[51] Int. Cl.⁶ .................................................. C02F 1/06
[52] U.S. Cl. ............................ 210/750; 210/764; 210/766
[58] Field of Search ..................................... 210/749, 764, 210/609, 750, 766

[56] References Cited

U.S. PATENT DOCUMENTS

| | | | |
|---|---|---|---|
| 4,076,620 | 2/1978 | Opferkuch, Jr. et al. | |
| 4,464,257 | 8/1984 | Lynch et al. | 210/195.1 |
| 4,793,927 | 12/1988 | Meehan et al. | 210/751 |
| 4,997,572 | 3/1991 | Wurtz | 210/710 |
| 5,135,664 | 8/1992 | Burnham | 210/751 |
| 5,196,043 | 3/1993 | Wurtz | 210/609 |
| 5,217,624 | 6/1993 | Yamane et al. | 210/751 |
| 5,281,341 | 1/1994 | Reimers et al. | 210/760 |
| 5,417,861 | 5/1995 | Burnham | 210/609 |
| 5,599,461 | 2/1997 | Peltier, Jr. et al. | 210/764 |
| 5,635,069 | 6/1997 | Boss et al. | 210/609 |

*Primary Examiner*—Jay H. Woo
*Assistant Examiner*—Betsey J. Morrison
*Attorney, Agent, or Firm*—Harrison & Egbert

[57] ABSTRACT

A process for treating a pathogen-containing sludge of biological solids including the steps of mixing the sludge with calcium oxide, ammonia and carbon dioxide so as to elevate a temperature of the mixed sludge to between 50° C. and 140° C. and to elevate a pH of the mixed sludge to greater than 9.8, pressurizing the mixed sludge to a pressure of greater than 14.7 p.s.i.a., and discharging the pressurized mixed sludge. The sludge has a water content of between 65% and 94% by weight. Ammonia is added to the sludge in the form of either ammonia gas, ammonium hydroxide, ammonium bicarbonate or as a byproduct of the reaction of the calcium oxide with the water in the sludge. Carbon dioxide is added to the sludge in the form of carbon dioxide gas or a reactant of ammonium bicarbonate. The pressurized mixed sludge is discharged by flashing the sludge across a restricting orifice and by evaporating a liquid component of the flashed sludge.

18 Claims, 1 Drawing Sheet

PROCESS FOR TREATING A WASTE SLUDGE OF BIOLOGICAL SOLIDS

TECHNICAL FIELD

The present invention relates to processes for the treatment of waste sludges. More particularly, the present invention relates to processes that reduce biological waste sludge bacteria, viruses and parasites.

BACKGROUND ART

In the past, various techniques have been developed for the purpose of sterilizing or decontaminating biological sludges and wastes. The most common process is the process of mixing lime with the sludge. The reaction of lime with the water in the sludge serves to elevate the temperature of the sludge for a maximum of 100° C.

U.S. Pat. Nos. 4,781,842 and 4,902,431, issued to Nicholson, teach a process to decontaminate wastewater sludge to a level that meets or exceeds U.S. EPA process standards. The process mixes sludge with an alkaline material sufficient to raise the pH of the end product to 12 or higher for at least one day. This process will raise the temperature to 50° C., but, will not sterilize the sludge, nor does it eliminate the pathogenic microorganisms.

U.S. Pat. No. 4,306,978, issued to Wurtz, relates to a process of lime stabilization of wastewater treatment plant: sludge. This patent discloses the dewatering of the sludge and intimately mixing calcium oxide to raise the temperature so as to produce a stabilized sludge particle.

None of these prior art inventions are capable of achieving temperatures, when mixed the sludge, of greater than 100° C. None of these prior art techniques allow for the shorter drying times as required by 40 C.F.R. Subchapter 0, Part 503.32 a.311.A–D. The shorter drying times, as required by this Subchapter, are in accordance with the following formula:

$$D = 131{,}700{,}000/(1 \times 10^{**}0.14t) \quad (1)$$

where D=time in days t=temperature in degrees Celsius

Importantly, it is important to be able to treat biological sludge so as to kill off the eggs of parasites. Presently, a parasite known as helminth infects many people throughout the world. This is a parasite which crosses the blood/brain barrier so that the parasite can actually reside in the brain. Treatment has occurred in the past by simply chlorinating water so as to kill the living parasite. Unfortunately, tests have shown that the mere chlorination of water does not kill the egg of the parasite. If the egg of the parasite is delivered to a human host, then the egg can actually hatch within the human body and seriously infect the human host. Presently, there is approximately a thirty-six month life expectancy for those that are infected with the helminth parasite.

This is particularly a problem associated with municipal biological sludge. In certain areas of the world, the biological sludge of waste treatment processes is distributed in farming areas for use as a fertilizer on the field. If the municipal sludge contains the eggs of this parasite, then these eggs will reside within the field so as to ultimately be found on foods grown in the fertilized field. Furthermore, any water runoff from the field will tend to move the eggs from the field into a river or stream. In certain areas of the world, river or stream water is used for consumption and for bathing. As such, the eggs of the parasite can be delivered to such persons. Additionally, farm animals can often contact the parasite by consuming the water from the streams or by consuming food in the fields. It is possible for humans to become infected from the parasite by way of the eating of the meat of the animal. As such, it is very important to develop a process for the treatment of a biological sludge which effectively kills the eggs of the helminth parasite.

U.S. Pat. No. 5,635,069, issued on Jun. 3, 1997 to the present inventors, describes a process for treating a waste sludge of biological solids. This process is intended to decontaminate wastewater sludge to a level that meets or exceeds U.S. EPA standards. This process mixes sludge, under pressure, with calcium oxide and with sulfamic acid sufficient to raise the temperature to achieve pathogen destruction. Although the process is efficient with regard to pathogen destruction, it does not address process and economic advantages of adding or producing, during the process, ammonia, ammonium hydroxide or ammonium bicarbonate in a concentration of 200 ppm to 30,000 ppm. Furthermore, the product of the process of U.S. Pat. No. 5,635,069 has a relatively high pH. As such, the product of the process is not desirable for use as farm fertilizers until the pH is sufficiently lowered to a range of between 8.5 and 9.

It is an object of the present invention to provide a process for reducing biological waste sludge pathogen, bacteria, virus and parasite concentrations to below harmful levels.

It is another object of the present invention to provide a process that converts the biological waste sludge into a sellable and useable end product.

It is still a further object of the present invention to provide a process that eliminates or reduces waste incineration and landfilling of waste sludges.

It is another object of the present invention to provide a process that eliminates the odors resulting from lime stabilization.

It is still a further object of the present invention to provide a process that facilitates the dewatering of the biological sludge.

It is still another object of the present invention to provide a process that recycles waste heat.

It is still a further object of the present invention to provide a process for treating waste sludges that is cost: effective, easy to use, and easy to install.

These and other objects and advantages of the present: invention will become apparent from a reading of the attached specification and appended claims.

SUMMARY OF THE INVENTION

The present invention is a process for treating a pathogen-containing sludge of biological solids comprising the steps of: (1) mixing the sludge with calcium oxide, ammonia and carbon dioxide so as to elevate a temperature of the mixed sludge to between 50° C. and 140° C. and to elevate a pH of the mixed sludge to greater than 9.8; (2) pressurizing the mixed sludge to a pressure of greater than 14.7 p.s.i.a.; and (3) discharging the pressurized mixed sludge.

In the process of the present invention, the sludge is of a type having a water content of between 65% and 94% by weight. The step of mixing the sludge includes the step of adding the ammonia to the sludge in the form of ammonia gas, ammonium hydroxide or ammonium bicarbonate or a byproduct of the reaction of calcium oxide with the water of the sludge. The step of adding the carbon dioxide to the sludge involves introducing either carbon dioxide gas or a reactant of ammonium bicarbonate.

The step of mixing includes transporting the sludge with the calcium oxide, the ammonia and the carbon dioxide through a pipe, and then reacting the calcium oxide with the sludge so as to produce calcium hydroxide. The ammonium bicarbonate is decomposed into ammonia and carbon dioxide. The carbon dioxide is reacted with the calcium oxide so as to form calcium carbonate and heat.

The mixed sludge is pressurized to between 14.7, p.s.i.a. and 120 p.s.i.a. The step of discharging includes flashing the pressurized mixed sludge across a restricting orifice, and then evaporating a liquid component of the flashed sludge. The liquid component is heated water and ammonia. The evaporated liquid component can be vented to a scrubber so that the ammonia is absorbed in a scrubbing liquid in the scrubber. The use of ammonia in the process effectively serves to destroy bacteria, penetrate cell walls, and disrupt the molecular configuration of viruses. The formation of calcium carbonate in the process reduces the pH of the end product of the sludge to between 8.5 and 9. As such, the sludge will have a pH which is suitable for use in agricultural purposes.

DETAILED DESCRIPTION OF THE INVENTION

Figure 1:
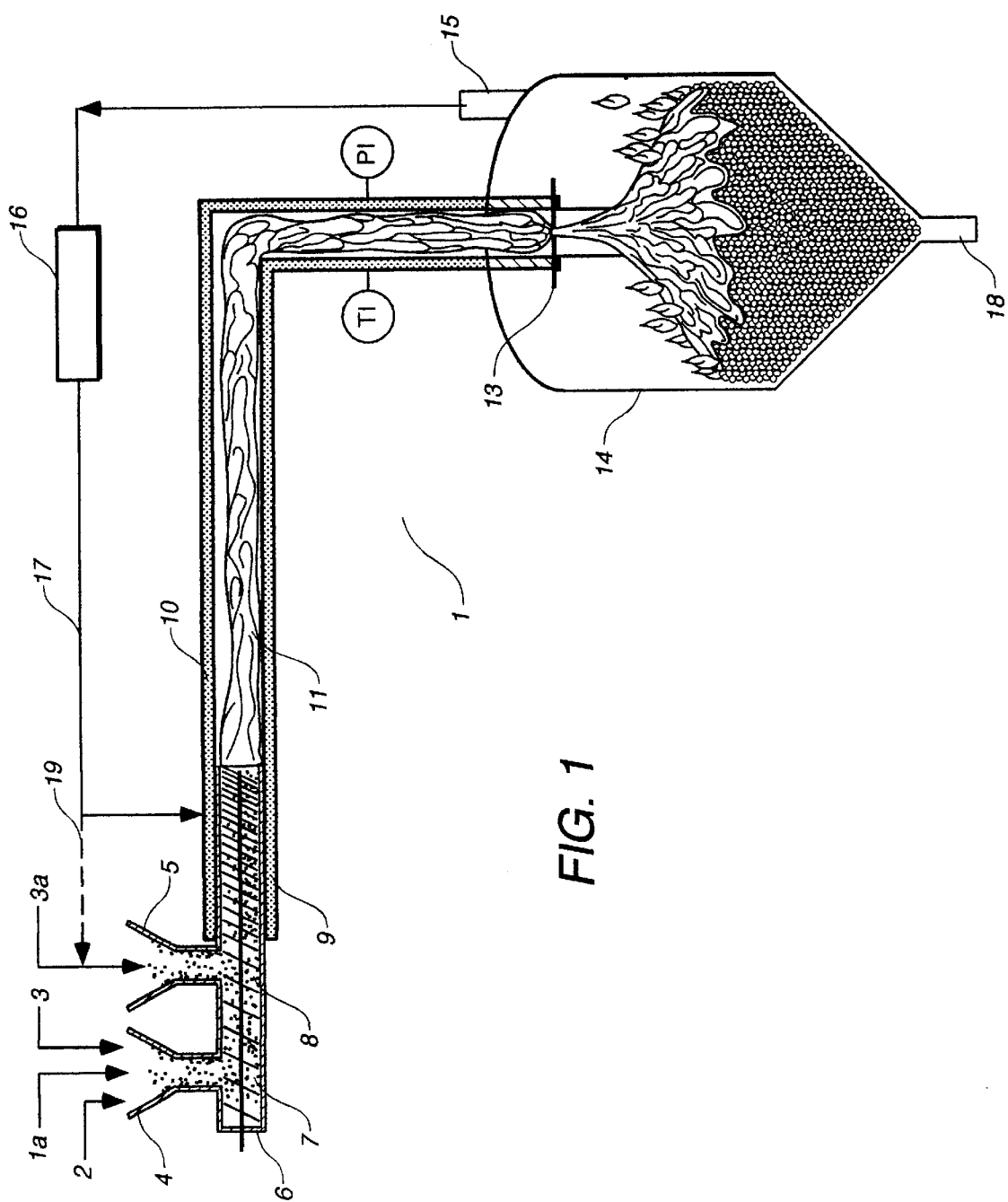
FIG. 1 is a flow diagram showing the process of the present invention for the treatment of waste sludges.

Referring to FIG. 1, there is shown at 1 the process for the treatment of a waste sludge of biological solids in accordance with the preferred embodiment of the present invention. In the process 1 of the present invention, the sludge 1a and an ammonia-containing chemical 2 are delivered together into a feed hopper 4. Within the concept of the present invention, the sludge la is a waste sludge, including sewage sludges and animal feces. The sludge la will have a water content of between 65% and 94%. It is important for the sludge 1a to have a water content so that the remaining chemicals can properly react with the sludge.

The ammonia-containing chemical can be either ammonium bicarbonate, ammonia gas or ammonium hydroxide or the byproduct of the reaction of calcium oxide with the water within the biological sludge (to be described hereinafter). Carbon dioxide should also be added to the sludge la. The carbon dioxide can be added as a carbon dioxide gas or as a reactant of the ammonium bicarbonate. In the present invention, it is important to introduce an ammonia-containing chemical so that the corrosive action of the ammonia can serve to ensure that the bacteria, virus and parasites are reduced to non-harmful levels. The ammonia-containing chemical is added to the waste sludge for concentration of between 200 ppm to 30,000 ppm.

After the sludge 1a, calcium oxide 3, and the ammonia-containing chemical 2 are added together into the feed hopper 4, the mixture is auger fed into the feed section 7 of a pump. The pump may contain a screw conveyor 6 that rotates so as to transport the mixture of the sludge la, ammonia-containing chemical 2, and the calcium oxide 3 through a reactor section 11. During the transport of the mixture of the sludge 1a ammonia-containing chemical 2 and the calcium oxide 3, these materials are mixed together by the pump.

At the feed section 8, other ingredients 3a can be added to the feed section. In particular, the condensed water and ammonia can be delivered to the feed hopper 5 and auger delivered to the feed section 8. These other ingredients can be passed along the calcium oxide 3 or otherwise delivered into the feed section 8. These materials are then transported to the reactor section 11. The pump 6 serves to increase the pressure of the mixed sludge to the desired value. Specifically, the compression zone of pump 6 serves to increase the pressure of the mixed sludge to a pressure of greater than 14.7 p.s.i.a. Experimentation has found that the desired effects of the present invention are achieved by pressurizing the mixed sludge to a pressure of between 14.7 p.s.i.a. and 120 p.s.i.a.

The adding of the calcium oxide to the mixture, and the increasing of the pressure through the motive force of the pump 6, causes an exothermic reaction along the reactor section 11. The combination of the calcium oxide and the water within the waste sludge produces $Ca(OH)_2$ and liberates 235 Kcal/mole of heat. This raises the temperature from ambient to 50° C. in 0.5 seconds.

In the present invention, calcium oxide can be produced from any source, such as kiln dust or lime dust. This material will make up between 5 percent and 50 percent of the waste sludge 1a by weight. In general, the calcium oxide reacts with the water in the sludge so as to elevate the temperature of the reaction within the reactor section 11 to between 50° C. and 140° C. The time of this reaction can be carried out for a period of time of between one second and twenty minutes. The pH is elevated to greater than 9.8.

The ammonia and carbon dioxide are added either individually as ammonia gas, ammonium hydroxide, carbon dioxide gas, or in a solid form such as ammonium bicarbonate, or as the byproducts of the reaction of calcium oxide with water from the biological sludge when the pH is greater than 9.8. The pressurized mixed sludge is transported through the predetermined length of pipe where the carbon dioxide reacts with the calcium byproducts formed from the reaction of calcium oxide and water so as to further elevate the temperature. The presence of ammonia ensures that the pH is elevated to between 11.5 and 13.3. The combination of elevated temperatures for a specified time, a pH of greater than 11.5 and the corrosive action of the ammonia ensures that the bacterias, the viruses, and the parasites are reduced to non-harmful levels.

In contrast to the prior U.S. Pat. No. 5,635,069 by the present inventors, the ammonia causes the pH to rise to levels far exceeding that of calcium oxide and, due to the corrosive nature of ammonia, destroys the bacteria, penetrates the cell walls, and disrupts permanently the molecular configuration of viruses. The addition or production of carbon dioxide in the process further enhances the pathogen destruction by reacting with calcium hydroxide to form calcium carbonate and heat. The attached Table I shows the significant production of heat by the process of the present invention:

TABLE I

| equation # | | | | reaction | | |
|---|---|---|---|---|---|---|
| 1 | CaO + | H2O | -----> | Ca(OH)2 + | Heat1 | |
| molecular weight | 56 | 18 | | 74 | −235 | kcal/mole |
| grams | 40 | 13 | | 53 | −168 | kcal |
| g-moles | 0,71 | 0,7 | | 0,7 | | |

TABLE I-continued

| equation # | reaction | | | | | | | |
|---|---|---|---|---|---|---|---|---|
| 2 | $(NH_4)_2CO_3$ | -----> | $2NH_3$ + | $CO_2$ + | $H_2O$ + | Host2 | | |
| molecular weight | 96 | | 17 | 44 | 18 | 0,73 | kcal/mole | |
| grams | 68 | | 24 | 31 | 13 | 1 | kcal | |
| g-moles | 0,71 | | 1,4 | 0,7 | 0,7 | | | |
| 3 | $CO_2$ + | $H_2O$ | -----> | $H_2CO_3$ | | | | |
| molecular weight | 44 | 18 | | 62 | | | | |
| grams | 31 | 13 | | 44 | | | | |
| g-moles | 0,7 | 0,7 | | 0,7 | | | | |
| 4 | $H_2CO_3$ + | $Ca(OH)_2$ | -----> | $CaCO_3$ + | $2H_2O$ + | Heat4 | | |
| molecular weight | 62 | 74 | | 100 | 18 | −269,50 | kcal/mole | |
| grams | 44 | 52 | | 71 | 26 | −205 | kcal | |
| g-moles | 0,7 | 0,7 | | 0,7 | 1,4 | | | |
| 5 | $CaO$ + | $(NH_4)_2CO_3$ | -----> | $2NH_3$ + | $CaCO_3$ + | $H_2O$ + | $CaO$ + | Heat 5 |
| molecular weight | 56 | 96 | | 17 | 100 | 18 | 56 | |
| grams | 40 | 68 | | 24 | 71 | 13 | 0 | −372 kcal |
| g-moles | 0,71 | 0,71 | | 1,42 | 0,71 | 0,71 | 0,01 | |
| | | | TOTAL HEAT OF REACTION = −931 Kcal per 100 gr. of CaO | | | | | |

Importantly, the water reacts with calcium oxide so as to form calcium hydroxide. Calcium hydroxide will react with the carbon dioxide so as to form calcium carbonate. The calcium carbonate serves to lower the pH of the resulting product of the process to a usable level of 8.5 to 9. As such, the lower pH will allow the ultimate waste sludge produced by the present process to be usable for agricultural purposes.

The material which exits the pump 6 enters an reactor section 11 having insulation 10. This reactor section 11 can contain static mixing elements. The material is continuously under pressure so as to prevent a premature flashing of the water. If flashing would occur, then the water content of the sludge would decrease during this stage and could cause the solidification of the sludge within the reactor section 11. A temperature monitor TI and a pressure monitor PI are provided along the reactor section 11 so as to provide monitoring of the reaction process and can provide for suitable reaction control systems.

After reacting, the material is flashed across a restricting orifice 13. This restricting orifice can be an opening, a die, or a valve. This orifice 13 is positioned generally adjacent the end of the reactor section 11. The orifice 13 will communicate with a flash chamber 14. As such, the material is delivered under pressure to the orifice and then released into the flash chamber 14. A vapor, including water vapor and ammonia, will exit the flash chamber 14 through the vent 15. This vapor will then pass through a condenser, or compressor 16, and be either reintroduced to the process through line 17 or into the feed hopper 5 through line 19. The reintroduction of such vapor can add nutrient value to the material. The vaporized gas can be condensed and either returned to the process or marketed as a nitrogen source for agricultural purposes.

In order to properly remove the water from the sludge, it is important that the flash chamber has an interior pressure of between 0 and 14.7 p.s.i.a. As such, when the mixed sludge passes through the orifice 13, the sludge will be exposed to a lesser pressure. This causes the water and other volatile components of the sludge to be evaporated. As a result, the water content and the temperature of the sludge are appropriately reduced. The heat of vaporization of the flashed material can be passed directly back to the sludge by using heat exchangers, pumps, or vapor compressors. After the sludge passes into the flash chamber 14, the resulting sludge will be a sterile, decontaminated product which is pathogen-free and vector-free. This product will meet or exceed U.S. EPA standards.

The sterilized sludge then exits the flash chamber 14 through the discharge opening 18. The resulting sterilized sludge can be either packaged or hauled to a disposal site. The sterilized sludge can be applied to land as a soil conditioner and as a fertilizer supplement. Potassium oxide, potassium hydroxide, or any other soil conditioning materials, can be added to the sludge such that the added material does not hinder the reaction.

The geometric configuration of the reactor section 11 is, of course, dependent upon the layout configuration of the facility in which it is used. The reactor section 11 should include insulation 10 so as to eliminate heat loss and to produce an adiabatic reaction.

The foregoing disclosure and description of the invention is illustrative and explanatory thereof. Various changes in the details of the described process may be made within the scope of the appended claims without departing from the true spirit of the invention. The present invention should only be limited by the following claims and their legal equivalents.

We claim:

1. A process for treating a pathogen-containing sludge of biological solids comprising the steps of:

blending the sludge with calcium oxide and with a chemical selected from the group consisting of: ammonium bicarbonate, ammonia and ammonium hydroxide, the sludge having a water content of between 65% and 94% by weight, said step of blending comprising the step of:

reacting said calcium oxide with the sludge so as to elevate the temperature of the sludge to between 50° C. and 140° C.;

pressurizing the blended sludge to a pressure of greater than 14.7 p.s.i.a.; and discharging the pressurized blended sludge.

2. The process of claim 1, said step of blending further comprising the step of:

mixing the sludge with ammonium bicarbonate during said step of reacting.

3. The process of claim 2, said step of blending further comprising the step of:

decomposing said ammonium bicarbonate into ammonia and carbon dioxide.

4. The process of claim 3, said step of decomposing comprising the step of:

reacting said carbon dioxide with said calcium oxide so as to form calcium carbonate and heat.

5. The process of claim 1, said step of pressurizing comprising:

pressurizing the blended sludge to a pressure of between 14.7 p.s.i.a. and 120 p.s.i.a.

6. The process of claim 1, said step of discharging comprising:

flashing the pressurized blended sludge across a restricting orifice; and evaporating a liquid component of said sludge.

7. The process of claim 6, said liquid component being heated water and ammonia.

8. The process of claim 7, further comprising the steps of:

venting the evaporated liquid component to a scrubber; and absorbing the ammonia in a scrubbing liquid in the scrubber.

9. The process of claim 1, said step of discharging comprising:

passing the pressurized blended sludge to a chamber having a pressure of between 0 and 14.7 p.s.i.a.

10. A process for treating a pathogen-containing sludge of biological solids comprising the steps of:

blending the sludge with calcium oxide and with ammonium bicarbonate, the sludge having a water content of between 65% and 94% by weight;

decomposing said ammonium bicarbonate into ammonia and carbon dioxide such that ammonia is produced in sufficient quantity so as to raise a pH of the blended sludge to at least 11.5;

reacting said carbon dioxide with said calcium oxide so as to form calcium carbonate and heat;

pressurizing the blended sludge to a pressure of greater than 14.7 p.s.i.a.; and discharging the pressurized blended sludge.

11. A process for treating a pathogen-containing sludge of biological solids comprising the steps of:

mixing the sludge with calcium oxide, ammonia and carbon dioxide so as to elevate a temperature of the mixed sludge to between 50° C. and 140° C. and to elevate a pH of the mixed sludge to greater than 9.8, said step of mixing comprising the steps of:

transporting the sludge with the calcium oxide and the ammonia and the carbon dioxide through a pipe; and reacting the calcium oxide with the sludge so as to produce calcium hydroxide;

pressurizing the mixed sludge in said pipe to a pressure of greater than 14.7 p.s.i.a.; and discharging the pressurized mixed sludge.

12. The process of claim 12, the sludge having a water content of between 65% and 94% by weight.

13. The process of claim 12, said step of mixing the sludge comprising the step of:

adding the carbon dioxide to the sludge in the form of a chemical selected from the group consisting of: carbon dioxide gas and a reactant of ammonium bicarbonate.

14. The process of claim 11, said step of mixing the sludge comprising the step of:

adding the ammonia to the sludge in the form of a chemical consisting of: ammonia gas, ammonium hydroxide, ammonium bicarbonate and a byproduct of the reaction of the calcium oxide with water in the sludge.

15. The process of claim 11, said step of pressurizing comprising the step of:

pressurizing the mixed sludge to a pressure of between 14.7 p.s.i.a. and 120 p.s.i.a.

16. The process of claim 11, said step of discharging comprising the steps of:

flashing the pressurized mixed sludge across a restricting orifice; and evaporating a liquid component of the flashed sludge.

17. The process of claim 16, said liquid component being heated water and ammonia.

18. The process of claim 17, further comprising the steps of:

venting the evaporated liquid component to a scrubber; and absorbing the ammonia in a scrubbing liquid in the scrubber.

* * * * *